(12) United States Patent
Letts et al.

(10) Patent No.: US 8,142,903 B2
(45) Date of Patent: Mar. 27, 2012

(54) CONSTRUCTION BOARDS WITH IMPROVED FACERS

(75) Inventors: John B. Letts, Carmel, IN (US); Robert C. Harrison, Roswell, GA (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 99 days.

(21) Appl. No.: 12/596,688

(22) PCT Filed: Apr. 18, 2008

(86) PCT No.: PCT/US2008/005095
§ 371 (c)(1),
(2), (4) Date: Oct. 20, 2009

(87) PCT Pub. No.: WO2008/130676
PCT Pub. Date: Oct. 30, 2008

(65) Prior Publication Data
US 2010/0136318 A1    Jun. 3, 2010

Related U.S. Application Data

(60) Provisional application No. 60/925,372, filed on Apr. 20, 2007.

(51) Int. Cl.
*E04C 1/00*    (2006.01)

(52) U.S. Cl. ............... 428/534; 428/536; 52/309.9
(58) Field of Classification Search ............ 428/534, 428/536; 52/309.9
See application file for complete search history.

(56) References Cited

U.S. PATENT DOCUMENTS

| | | | | |
|---|---|---|---|---|
| 5,345,738 | A | * 9/1994 | Dimakis | ............... 52/309.9 |
| 6,044,604 | A | * 4/2000 | Clayton et al. | ......... 52/309.9 |
| 7,763,134 | B1 | * 7/2010 | Kumar | ................ 156/39 |
| 2004/0087674 | A1 | 5/2004 | Letts | |
| 2004/0102537 | A1 | 5/2004 | Letts | |

FOREIGN PATENT DOCUMENTS

| | | | |
|---|---|---|---|
| EP | 0940249 | A | 8/1999 |
| EP | 0940249 | * | 9/1999 |
| GB | 1132452 | * | 11/1968 |
| GB | 1132452 | A | 11/1968 |
| WO | 9900559 | A | 1/1999 |
| WO | WO99/00559 | * | 1/1999 |

* cited by examiner

*Primary Examiner* — Leszek Kiliman
(74) *Attorney, Agent, or Firm* — Jason A. Houser; Arthur M. Reginelli

(57) ABSTRACT

A construction board (10) comprising a cellular body and at least one facer (22,23), where the at least one cellulosic facer (22,23) is characterized by a burst strength of at least 250 kPa pursuant to T403 om-02 (TAPPI).

14 Claims, 2 Drawing Sheets

CONSTRUCTION BOARDS WITH IMPROVED FACERS

This application claims the benefit of International Application Serial No. PCT/US0805095 filed Apr. 18, 2008, which claims the benefit of U.S. Provisional Application Ser. No. 60/925,372, filed Apr. 20, 2007, which are incorporated herein by reference.

FIELD OF THE INVENTION

One or more embodiments of the present invention relate to construction boards with particular cellulosic facers that yield advantageous properties to the construction boards.

BACKGROUND OF THE INVENTION

Construction boards, particularly those employed in the construction industry, may include a foam layer and at least one facer. The foam layer can include a closed cell polyurethane or polyisocyanurate foam. Numerous facer materials have been employed including cellulosic materials, foil, and fiberglass.

The facer materials can impact the ultimate performance of the construction boards. This is particularly true where the construction boards include roofing insulation boards or roofing recover boards that must meet various performance specifications.

Many facers employed in roofing construction boards commercially employed today include various recycled cellulosic materials. Inasmuch as the quality of these cellulosic materials may be suspect, conventional practice includes combining the cellulosic material with fiberglass in an effort to improve the performance of the facer with construction boards.

SUMMARY OF THE INVENTION

One or more embodiments of the present invention provides a construction board comprising a cellular body, and at least one facer, where the at least one cellulosic facer is characterized by a burst strength of at least 250 kPa pursuant to T403 om-02 (TAPPI).

DETAILED DESCRIPTION OF ILLUSTRATIVE EMBODIMENTS

One or more embodiments of the present invention are directed toward foam construction boards that include at least one cellulosic facer. The at least one cellulosic facer employed in one or more embodiments has particular characteristics that have been found to give particularly advantageous properties to construction boards in the roofing industry. In one or more embodiments, these construction boards include insulation boards and/or recover boards. In particular embodiments, the construction boards include two cellulosic facers, one positioned at each of two planar surfaces of the construction boards. Besides the at least one cellulosic facer, the construction boards may be similar to those construction boards known in the art, particularly in the roofing industry. These construction boards may include those described in U.S. Patent Publication Nos. 2004/0102537 and 2004/0087674, which are incorporated herein by reference.

Figure 1:
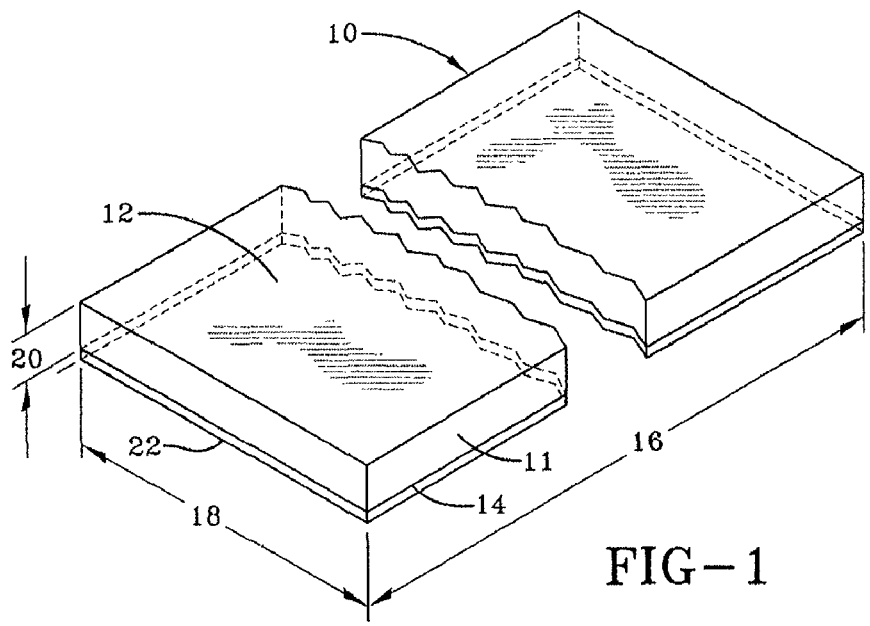
FIG. 1 is a fragmentary prospective view of a construction board of one or more embodiments of the present invention.
Figure 1A:
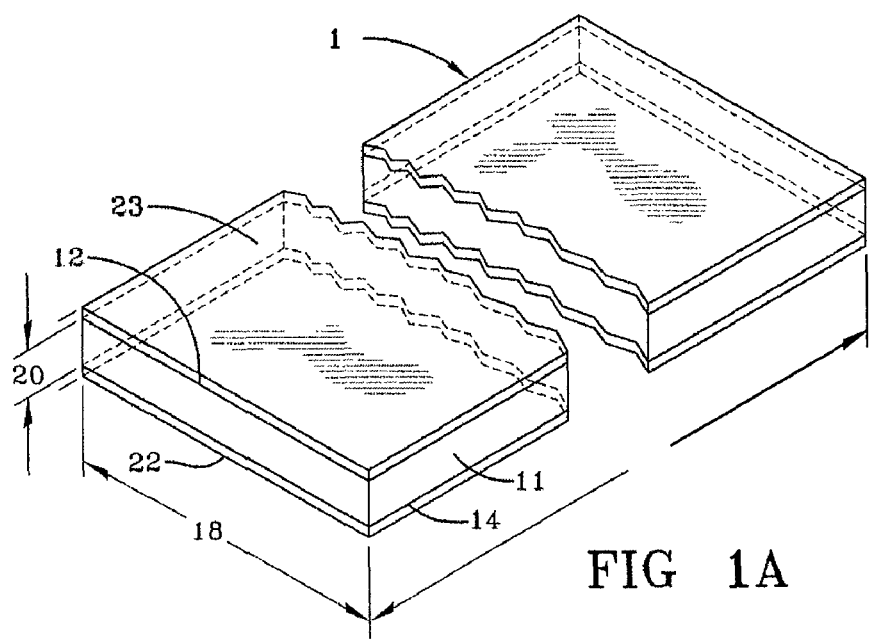
FIG. 1A is a fragmentary prospective view of a construction board of one or more embodiments of the present invention wherein the construction board includes two facers.

Construction boards of one or more embodiments of the present invention may be described with reference to FIGS. 1 and 1A. FIG. 1 shows a construction board 10 including a foam layer 11 and a cellulosic facer 22. The construction board has a length 16, a width 18, and a height 20. In one or more embodiments, cellulosic facer 22 is integrally attached to foam layer 12 across planar surface 14. FIG. 1A shows a similar construction board further including second facer 23 that may be integrally attached to the opposite planar surface of foam layer 12.

As noted above, the construction boards of the present invention can be employed as roofing insulation boards or as roofing recover boards.

In one or more embodiments, the construction boards of the present invention are insulation boards. The foam layer 11 of these insulation boards may be characterized by having an index of at least 120, in other embodiments at least 150, in other embodiments at least 175, and in other embodiments at least 200, as determined by PIR/PUR ratio as determined by IR spectroscopy using standard foams of known index (note that ratio of 3 PIR/PUR provides an ISO Index of 300).

In one or more embodiments, the foam layer 11 of insulation boards may be characterized by a foam density (ASTM C303) that is less than 2.5 pounds per cubic foot (12 kg/m$^2$), in other embodiments less than 2.0 pounds per cubic foot (9.8 kg/m$^2$), in other embodiments less than 1.9 pounds per cubic foot (9.3 kg/m$^2$), and still in other embodiments less than 1.8 pounds per cubic foot (8.8 kg/m$^2$). In one or more embodiments, the foam layer 11 of insulation boards is characterized by having a density that is greater than 1.50 pounds per cubic foot (7.32 kg/m$^2$), or in other embodiments, greater than 1.55 pounds per cubic foot (7.57 kg/m$^2$).

In other embodiments, the construction boards of the present invention are roofing recover boards. As described in co-pending U.S. application 60/898,353, which is incorporated herein by reference, it may be advantageous to increase the density of the foam layer for use as a recover board. The foam layer 11 of these roofing recover boards may be characterized by density that is greater than 2.5 pounds per cubic foot (12.2 kg/m$^2$), as determined according to ASTM C303, in other embodiments the density is greater than 2.8 pounds per cubic foot (13.7 kg/m$^2$), in other embodiments greater than 3.0 pounds per cubic foot (14.6 kg/m$^2$), and still in other embodiments greater than 3.5 pounds per cubic foot (17.1 kg/m$^2$). In one or more embodiments, the density of foam layer 11 of the recovery boards may be less than 20 pounds per cubic foot (97.6 kg/m$^2$), in other embodiments less than 10 pounds per cubic foot (48.8 kg/m$^2$), in other embodiments less than 6 pounds per cubic foot (29.3 kg/m$^2$), in other embodiments less than 5.9 pounds per cubic foot (28.8 kg/m$^2$), in other embodiments less than 5.8 pounds per cubic foot (28.3 kg/m$^2$), in other embodiments less than 5.7 pounds per cubic foot (27.8 kg/m$^2$), in other embodiments less than 5.6 pounds per cubic foot (27.3 kg/m$^2$), and still in other embodiments less than 5.5 pounds per cubic foot (26.9 kg/m$^2$).

In one or more embodiments, the foam layer 11 of the recovery boards may be characterized by an ISO Index, as determined by PIR/PUR ratio as determined by IR spectroscopy using standard foams of known index (note that ratio of 3 PIR/PUR provides an ISO Index of 300) of at least 180, in other embodiments at least 200, in other embodiments at least 220, in other embodiments at least 270, in other embodiments at least 285, in other embodiments at least 300, in other embodiments at least 315, and in other embodiments at least 325. In these or other embodiments, the ISO Index is less than 360, in other embodiments less than 350, in other embodiments less than 340, and in other embodiments less than 335.

Figure 2:
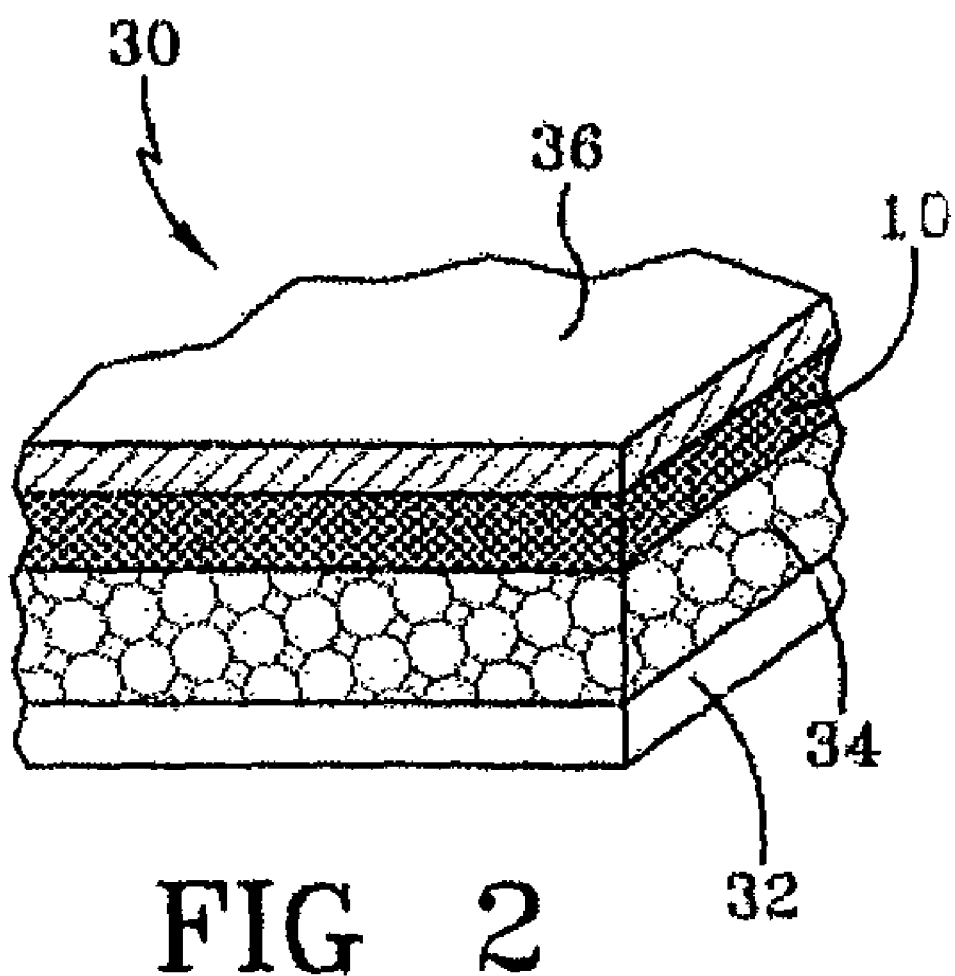
FIG. 2 is a fragmentary prospective view of a roofing system including two distinct construction boards according to one or more embodiments of the present invention.

FIG. 2 shows a roofing system 30 including a roof deck 32, an optional insulation layer 34, which may include an insulation board according to one or more embodiments of the present invention, an optional recover board 10, which may include a construction board of one or more embodiments of the present invention, and a membrane 36.

In one or more embodiments, the at least one cellulosic facer is characterized by a burst strength, pursuant to T403 om-02 (TAPPI), as measured apart from the construction boards, of at least 250 kPa, in other embodiments at least 350 kPa, in other embodiments at least 450 kPa, in other embodiments at least 520 kPa, in other embodiments at least 600 kPa, and in other embodiments at least 650 kPa. In these or other embodiments, the burst strength is less than 1,500 kPa, in other embodiments less than 1,000 kPa, and in other embodiments less than 850 kPa.

In one or more embodiments, the at least one cellulosic facer is characterized by a basis weight, pursuant to T410 om-02 (TAPPI), as measured apart from the construction boards, of at least 200 g/m$^2$, in other embodiments at least 250 g/m$^2$, in other embodiments at least 300 g/m$^2$, in other embodiments at least 350 g/m$^2$, and in other embodiments at least 400 g/m$^2$. In other embodiments, the at least one cellulosic facer may be characterized by a basis weight of less than 1,000 g/m$^2$, in other embodiments less than 800 g/m$^2$, and in other embodiments less than 600 g/m$^2$. In these or other embodiments, the basis weight of the at least one cellulosic facer is consistent across the planar surface of the construction board within about ±25 g/m$^2$, in other embodiments within about ±20 g/m$^2$, in other embodiments within about ±15 g/m$^2$, and in other embodiments within ±12 g/m$^2$.

In one or more embodiments, the at least one cellulosic facer employed in the preset invention is free of or only includes limited amounts of non-cellulosic materials (e.g. fiberglass). In particular embodiments, the at least one cellulosic facer includes less than 15% by weight, in other embodiments less than 10% by weight, in other embodiments less than 5% by weight, and in other embodiments less than 1% by weight fiberglass based on the entire weight of the facer. In particular embodiments, the at least one cellulosic facer is substantially devoid of fiberglass, which includes an amount less than would otherwise have an appreciable impact on the facer and/or construction board. In one or more embodiments, the at least one cellulosic facer is devoid of fiberglass.

In one or more embodiments, the at least one facer has a thickness of at least about 5 mils (0.12 mm), in other embodiments at least about 7 mils (0.17 mm), and in other embodiments at least about 10 mils (0.25 mm). In these or other embodiments, the at least one cellulosic facer has a thickness of less than about 20 mils (0.5 mm), in other embodiments less than about 18 mils (0.45 mm), and in other embodiments less than about 12 mils (0.3 mm).

In one or more embodiments, the at least one cellulosic facer is characterized by a machine direction tensile strength, pursuant to T494 om-01 (TAPPI), as measured apart from the construction board, of at least 7.5 kn/m, in other embodiments at least 8.5 kn/m, in other embodiments at least 10.0 kn/m, in other embodiments at least 11.0 kn/m, and in other embodiments at least 12.0 kn/m.

In one or more embodiments, the at least one cellulosic facer includes cellulosic fibers that derive from conifers. In these or other embodiments, the facer may include cellulosic fibers that derive from southern pines. In particular embodiments, the cellulosic fibers are fibrillated. These cellulosic fibers may advantageously derive from virgin pulp, as well as recycled materials. These recycled materials may include old corrugated containers, mixed office waste, and old newspapers.

In one or more embodiments, the cellulosic fibers employed in the facer of the present invention include fiber characterized by a relatively long length, especially as compared to cellulosic fibers conventionally employed in the art of making facers for insulation board. In one or more embodiments, the fibers employed in the present invention are at least 5% greater, in other embodiments at least 10% greater, in other embodiments at least 20% greater, in other embodiments at least 40% greater, and in other embodiments at least 80% greater in length than the length of fiber in conventional cellulosic materials (e.g. recycled cellulosic materials) conventionally employed in the art.

In one or more embodiments, the at least one cellulosic facer may also include other ingredients conventionally found in facers of construction boards. For example, the cellulosic facer may include pigments, mold inhibiting agents, filler, and/or flame retardants.

The construction boards of one or more embodiments may be prepared by employing conventional techniques that include a laminator. As is generally known in the art, the facer is deposited onto a laminator, and the foam-forming material is subsequently deposited onto the facer. Where an additional facer is incorporated into the construction board, the additional facer may be positioned and ultimately contacted with the rising foam product. In one or more embodiments, the facer is preheated prior to being contacted with the foam or foam-forming material. In one or more embodiments, the facer is preheated to a temperature of at least 90° F. (32° C.), in other embodiments at least 100° F. (37° C.), and in other embodiments at least 110° F. (43° C.). In these or other embodiments, the facer is preheated to a temperature of less than 130° C., and in other embodiments less than 120° C.

The boards of one or more embodiments of this invention can be manufactured by using known techniques for producing polyurethane or polyisocyanurate insulation In general, processes for the manufacture of polyurethane or polyisocyanurate insulation boards are known in the art as described in U.S. Pat. Nos. 6,117,375, 6,044,604, 5,891,563, 5,573,092, U.S. Publication Nos. 2004/01099832003/0082365, 2003/0153656, 2003/0032351, and 2002/0013379, as well as U.S. Ser. Nos. 10/640,895, 10/925,654, and 10/632,343, which are incorporated herein by reference.

In one or more embodiments, the boards of the present invention may be produced by developing or forming polyurethane and/or polyisocyanurate foam in the presence of a blowing agent. The foam may be prepared by contacting an A-side stream of reagents with a B-side stream of reagents and depositing the mixture or developing foam onto a laminator carrying a facer. The A-side stream may include an isocyanate compound and the B-side may include an isocyanate-reactive compound.

In one or more embodiments, the A-side stream may only contain the isocyanate. In other embodiments, the A-side stream may also contain flame-retardants, surfactants, blowing agents and other non-isocyanate-reactive components.

Suitable isocyanates are generally known in the art. Useful isocyanates include aromatic polyisocyanates such as diphenyl methane, diisocyanate in the form of its 2,4'-, 2,2'-, and 4,4'-isomers and mixtures thereof, the mixtures of diphenyl methane diisocyanates (MDI) and oligomers thereof known in the art as "crude" or polymeric MDI having an isocyanate functionality of greater than 2, toluene diisocyanate in the form of its 2,4' and 2,6'-isomers and mixtures thereof, 1,5-naphthalene diisocyanate, and 1,4' diisocyanatobenzene. Exemplary isocyanate components include polymeric Rubinate 1850 (Huntsmen Polyurethanes), polymeric Lupranate M70R (BASF), and polymeric Mondur 489N (Bayer).

The B-side stream, which contains isocyanate reactive compounds, may also include flame retardants, catalysts, emulsifiers/solubilizers, surfactants, blowing agents, fillers, fungicides, anti-static substances, water and other ingredients that are conventional in the art.

An exemplary isocyanate-reactive component is a polyol. The terms polyol or polyol component include diols, polyols, and glycols, which may contain water as generally known in the art. Primary and secondary amines are suitable, as are polyether polyols and polyester polyols. Useful polyester polyols include phthalic anhydride based PS-2352 (Stepen), phthalic anhydride based polyol PS-2412 (Stepen), teraphthalic based polyol 3522 (Kosa), and a blended polyol TR 564 (Oxid). Useful polyether polyols include those based on sucrose, glycerin, and toluene diamine. Examples of glycols include diethylene glycol, dipropylene glycol, and ethylene glycol. Suitable primary and secondary amines include, without limitation, ethylene diamine, and diethanolamine. In one embodiment a polyester polyol is employed. In one or more embodiments, the present invention may be practiced in the appreciable absence of any polyether polyol. In certain embodiments, the ingredients are devoid of polyether polyols.

Catalysts are believed to initiate the polymerization reaction between the isocyanate and the polyol, as well as a trimerization reaction between free isocyanate groups when polyisocyanurate foam is desired. While some catalysts expedite both reactions, two or more catalysts may be employed to achieve both reactions. Useful catalysts include salts of alkali metals and carboxylic acids or phenols, such as, for example potassium octoate; mononuclear or polynuclear Mannich bases of condensable phenols, oxo-compounds, and secondary amines, which are optionally substituted with alkyl groups, aryl groups, or aralkyl groups; tertiary amines, such as pentamethyldiethylene triamine (PMDETA), 2,4,6-tris [(dimethylamino)methyl]phenol, triethyl amine, tributyl amine, N-methyl morpholine, and N-ethyl morpholine; basic nitrogen compounds, such as tetra alkyl ammonium hydroxides, alkali metal hydroxides, alkali metal phenolates, and alkali metal acholates; and organic metal compounds, such as tin(II)-salts of carboxylic acids, tin(IV)-compounds, and organo lead compounds, such as lead naphthenate and lead octoate.

Surfactants, emulsifiers, and/or solubilizers may also be employed in the production of polyurethane and polyisocyanurate foams in order to increase the compatibility of the blowing agents with the isocyanate and polyol components.

Surfactants may serve two purposes. First, they may help to emulsify/solubilize all the components so that they react completely. Second, they may promote cell nucleation and cell stabilization. Exemplary surfactants include silicone co-polymers or organic polymers bonded to a silicone polymer. Although surfactants can serve both functions, a more cost effective method to ensure emulsification/solubilization may be to use enough emulsifiers/solubilizers to maintain emulsification/solubilization and a minimal amount of the surfactant to obtain good cell nucleation and cell stabilization. Examples of surfactants include Pelron surfactant 9920, Goldschmidt surfactant B8522, and GE 6912. U.S. Pat. Nos. 5,686,499 and 5,837,742 are incorporated herein by reference to show various useful surfactants.

Suitable emulsifiers/solubilizers include DABCO Ketene 20AS (Air Products), and Tergitol NP-9 (nonylphenol+9 moles ethylene oxide).

Flame Retardants may be used in the production of polyurethane and polyisocyanurate foams, especially when the foams contain flammable blowing agents such as pentane isomers. Useful flame retardants include tri(monochloropropyl) phosphate (a.k.a. tris(cloro-propyl) phosphate), tri-2-chloroethyl phosphate (a.k.a. tris(chloro-ethyl) phosphate), phosphonic acid, methyl ester, dimethyl ester, and diethyl ester. U.S. Pat. No. 5,182,309 is incorporated herein by reference to show useful blowing agents. Useful blowing agents include isopentane, n-pentane, cyclopentane, alkanes, (cyclo) alkanes, hydrofluorocarbons, hydrochlorofluorocarbons, fluorocarbons, fluorinated ethers, alkenes, alkynes, carbon dioxide, and noble gases.

In order to demonstrate the practice of the present invention, the following examples have been prepared and tested. The examples should not, however, be viewed as limiting the scope of the invention. The claims will serve to define the invention.

EXAMPLES

In order to demonstrate that the cellulosic materials employed in the practice of the present invention are highly distinct from other materials that are commercially available, several cellulosic materials were obtained and tested for burst strength by employing techniques described in T403 om-02 (TAPPI). In order to account for different basis weights, the ratio of burst strength to basis weight was calculated. The various materials tested and the results of the test are provided in table I.

TABLE I

| Material | Basis Weight pounds/ 1000 sq. ft. | Burst Strength kPa | Burst Strength/ Basis Weight |
|---|---|---|---|
| Low Quality Newsprint | 9.3 | 52.4 | 5.63 |
| High Quality Newsprint | 10.1 | 48.3 | 4.78 |
| Uncoated Freesheet (light) | 15.8 | 109.6 | 6.94 |
| Uncoated freesheet (heavy) | 18.8 | 275.8 | 14.67 |
| Magazine Stock (light) | 9.95 | 68.9 | 6.92 |
| Magazine Stock (heavy) | 30.4 | 264.1 | 8.69 |
| Linerboard | 33 | 558.5 | 16.93 |
| Linerboard | 42 | 730.8 | 17.4 |
| Linerboard | 51 | 834.3 | 16.36 |
| Black Facer | 53.8 | 206.8 | 3.84 |
| Linerboard | 57 | 930.8 | 16.33 |
| Linerboard | 62 | 958.4 | 15.46 |
| Linerboard | 69 | 1006.6 | 14.59 |

Various modifications and alterations that do not depart from the scope and spirit of this invention will become apparent to those skilled in the art. This invention is not to be duly limited to the illustrative embodiments set forth herein.

What is claimed is:

1. A construction board comprising:
   a cellular body; and
   at least one cellulosic facer, where the at least one cellulosic facer is characterized by a burst strength of at least 250 kPa pursuant to T403 om-02 (TAPPI), where the at least one cellulosic facer is characterized by a basis weight of at least 200 grams per square meter pursuant to T410 om-02 (TAPPI), where the at least one cellulosic facer has a thickness of from about 5 to about 20 mils, where the at least one cellulosic facer is characterized by a machine direction tensile strength pursuant to T494 om-01 (TAPPI) of at least 7.5 KN/m, and wherein the thickness of the at least one cellulosic facer is uniform within about ±3 mil.

2. The construction board of claim 1, where the at least one cellulosic facer is characterized by a burst strength of at least 450 kPa pursuant to T403 om-02 (TAPPI), where the at least one cellulosic facer is characterized by a basis weight of least 300 grams per square meter T410 om-02 (TAPPI), where the at least one cellulosic facer has a thickness of less than about 15 mils, where the at least one cellulosic facer is characterized by a machine direction tensile strength pursuant to T494 om-01 (TAPPI) of at least 9.5 KN/m, and wherein the thickness of the at least one cellulosic facer is uniform within about ±1 mil.

3. The construction board of claim 1, where the at least one cellulosic facer is substantially devoid of fiberglass.

4. The construction board of claim 1, where the at least one cellulosic facer includes liner board.

5. The construction board of claim 1, where the at least one cellulosic facer includes cellulosic fibers deriving from conifers.

6. The construction board of claim 1, where the at least one cellulosic facer includes cellulosic fibers deriving from southern pines.

7. The construction board of claim 1, where the at least one cellulosic facer includes cellulosic fibers that are fibrillated.

8. The construction board of claim 1, where the at least one cellulosic facer includes cellulosic fibers deriving from virgin pulp, old corrugated containers, mixed office waste, and/or old newspaper.

9. The construction board of claim 1, where the at least one facer has been heat treated at a temperature of from about 100 to about 120° F.

10. The construction board of claim 1, where the cellular body is a closed-cell cellular structure.

11. The construction board of claim 1, where the cellular body comprises polyisocyanurate.

12. The construction board of claim 1, where the at least one cellulosic facer includes a pigment, mold inhibiting agents, or flame retardant.

13. The construction board of claim 1, where the at least one cellulosic facer consists essentially of cellulosic fiber.

14. The construction board of claim 1, where the at least one cellulosic facer consists essentially of cellulosic fiber and optionally pigments, mold-inhibiting agents, filler, and/or flame retardants.

\* \* \* \* \*